(12) United States Patent
Lutz et al.

(10) Patent No.: US 8,404,324 B2
(45) Date of Patent: Mar. 26, 2013

(54) POLYPROPYLENE COMPOSITIONS

(75) Inventors: William G. Lutz, Linwood, MI (US); John Kaarto, Missouri City, TX (US); Robert J. Donald, Midland, MI (US)

(73) Assignee: Braskem America, Inc., Philadelphia, PA (US)

( * ) Notice: Subject to any disclaimer, the term of this patent is extended or adjusted under 35 U.S.C. 154(b) by 92 days.

(21) Appl. No.: 12/759,983

(22) Filed: Apr. 14, 2010

(65) Prior Publication Data

US 2011/0256333 A1 Oct. 20, 2011

(51) Int. Cl.
 *B32B 1/08* (2006.01)
 *C08K 7/00* (2006.01)

(52) U.S. Cl. .......... 428/36.9; 524/401; 523/220

(58) Field of Classification Search .......... 428/36.9; 524/401; 523/220
See application file for complete search history.

(56) References Cited

U.S. PATENT DOCUMENTS

| | | |
|---|---|---|
| 3,424,703 A | 1/1969 | Jones |
| 3,538,209 A | 11/1970 | Hegler |
| 3,677,676 A | 7/1972 | Hegler |
| 5,091,461 A | 2/1992 | Skochdopole |
| 6,176,269 B1 | 1/2001 | Jarvenkyla |
| 6,472,473 B1 | 10/2002 | Ansems et al. |
| 6,684,910 B2 | 2/2004 | Stoffelsma et al. |
| 6,841,620 B2 | 1/2005 | Ansems et al. |
| 2005/0106965 A1 * | 5/2005 | Wevers et al. .......... 442/85 |

FOREIGN PATENT DOCUMENTS

| | | |
|---|---|---|
| EP | 0391413 A2 | 10/1990 |
| EP | 0639613 A1 | 2/1995 |
| WO | 99/10424 A1 | 3/1999 |
| WO | 00/15405 A1 | 3/2000 |
| WO | 01/05569 A1 | 1/2001 |
| WO | 2007/017166 A1 | 2/2007 |

OTHER PUBLICATIONS

Scholte, et al., J. Appln. Polym. Sci., 29, 2763-3782 (1984).
Otocka, et al., Macromolecules, 4, 507-514 (1971).

* cited by examiner

*Primary Examiner* — Robert D. Harlan
(74) *Attorney, Agent, or Firm* — Duane Morris LLP

(57) ABSTRACT

A mineral-filled, polypropylene composition comprises (i) a coupled, impact propylene polymer, and (ii) at least 0.5 weight percent (wt %) based on the weight of the composition of at least one of calcium carbonate and talc. The compositions are useful in the manufacture of three-layer pipe comprising (A) a first or outer non-foam layer; (B) a second or middle foam layer; and (C) a third or inner non-foam layer.

17 Claims, No Drawings

US 8,404,324 B2

POLYPROPYLENE COMPOSITIONS

FIELD OF THE INVENTION

This invention relates to polypropylene compositions. In one aspect the invention relates to compositions comprising coupled, impact-resistant polypropylene while in another aspect, the invention relates to plastic pipe made from such compositions. In yet another aspect, the invention relates to such plastic pipe comprising three or more layers in which the external layers are not foamed and at least one of the interior layers is foamed. In still another aspect, the invention relates to a multi-layer pipe in which at least the external non-foamed layers and an internal foamed layer comprise a coupled, impact-resistant polypropylene filled with at least one of calcium carbonate and talc.

BACKGROUND OF THE INVENTION

Multilayer, plastic pipe and its method of manufacture are long and well known. Original plastic pipe, multilayer or otherwise, was typically constructed from a polyolefin or substituted polyolefin, e.g., polyvinyl chloride (PVC), and it was typically smooth-walled (both inner and outer walls), extruded from annular dies, and exhibited poor diametral compressive strength, i.e., it was easy to collapse by the application of a compressive force.

The problem of poor compressive strength has been addressed on a number of different levels. One solution was to increase the wall thickness of the pipe, but this came at the cost of using more polymer to construct the pipe, an increase in pipe weight, and a loss of pipe flexibility. Another solution was to add corrugation to the outer wall of the pipe, e.g., U.S. Pat. Nos. 3,538,209 and 3,677,676. Still another solution was to use a three-layer pipe construction in which the middle or center layer was foamed, e.g., U.S. Pat. No. 6,176,269. Yet another solution was to use a polymer that exhibited a greater impact strength or resistance than the conventional polymers used for these applications, e.g., U.S. Pat. No. 6,841,620. Improvements on these last two approaches remain of interest to the pipe industry.

WO 2007/017166 describes a pipe of polymer micro-foam material having an impact strength value measured at 0° C. which is higher than 100% and up to 400% of the impact strength as required in the EN-norm of a pipe of the same dimensions and basic material in non-foamed condition. It also describes methods for producing such pipe.

WO 2001/005569 describes a method for forming an article comprising closed-cell micro-foam from thermoplastic in which at least one molten thermoplastic comprising a foaming agent is subjected under pressure to a forming operation and, after the pressure has been at least partially released, is cooled, characterized in that the amount of foaming agent is substantially identical to the amount corresponding to that quantity of gas released by the foaming agent. The micro-foam has a close-packed structure of foam cells with a specific foam-cell diameter, substantially uniform throughout the foam, at the pressure prevailing during cool-down.

WO 2000/015405 describes the extrusion of foamed articles made from thermoplastic. A molten mass comprising heated, pressurized plastic which has been mixed with a foaming agent is pressed firstly through an orifice which shapes the article, then through a nucleator, i.e., a perforated plate, and then is cooled to form a very fine micro-foam structure. Particularly good results are obtained if the molten material is compressed without exposure to any significant shear force for a short time immediately after it leaves the nucleator.

U.S. Pat. No. 6,684,910 describes a pipe of layers of thermoplastic polyolefins of the same type but with different properties. The layers are connected inseparably with one another, an outer first layer and a second layer that adjoins the first layer on the inside and consisting of a material that has not been cross-linked. The second layer has a full notch creep test (FNCT) of approximately the same value or the notched pipe test (NPT) value of a one-layer standard pressure pipe. The first layer has an FNCT or NPT value that is higher by a factor of at least 3 than that of the second value. A third layer is provided that adjoins the second layer on the inside, and it too consists of material that is not cross-linked and has a FNCT value that is higher by a factor of at least 3 than that of the second layer and an NPT layer that is higher by a factor of at least 2 than that of the second layer.

BRIEF SUMMARY OF THE INVENTION

In one embodiment the invention is a mineral-filled, polypropylene composition comprising (i) a coupled, impact propylene copolymer, and/or a coupled blend of polypropylene homopolymer and impact modifier, (ii) at least 25 weight percent (wt %) based on the weight of the composition of at least one mineral filler, e.g., calcium carbonate and/or talc, and (iii) a foaming agent. In another embodiment, the amount of filler in this composition is from 25 to 70, preferably from 28 to 60 and more preferably from 40 to 50, wt % based on the total weight of the composition. The composition of this embodiment is useful for, among other things, the preparation of a foam layer of a multi-layer article, e.g., the core layer of a three-layer pipe.

In one embodiment the invention is a mineral-filled, polypropylene composition comprising (i) a coupled, impact propylene copolymer, and/or a coupled blend of polypropylene homopolymer and impact modifier, (ii) at least 25 weight percent (wt %) based on the weight of the composition of at least a two-component mineral filler in which one component is a platelet filler, e.g. talc, and the other component is a non-platelet filler, e.g., calcium carbonate, and (iii) a foaming agent. Typically the weight ratio of platelet to non-platelet filler is between 1:30 and 1:3. The composition of this embodiment is useful for, among other things, the preparation of a foam layer of a multi-layer article, e.g., the core layer of a three-layer pipe.

In another embodiment, the invention is a mineral-filled, polypropylene composition comprising (i) a coupled, impact propylene copolymer, and/or a coupled blend of polypropylene homopolymer and impact modifier, and (ii) optionally, a mineral filler, e.g., calcium carbonate and/or talc. In another embodiment, the composition contains a filler, and the amount of filler is from greater than zero to 50, preferably from 3 to 30 and more preferably from 5 to 20, wt % based on the total weight of the composition. The composition of this embodiment is useful for, among other things, the preparation of a non-foam layer of a multi-layer article, e.g., the inner or inside layer of a three-layer pipe.

In another embodiment, the invention is a mineral-filled, polypropylene composition comprising (i) a coupled, impact propylene copolymer, and/or a coupled blend of polypropylene homopolymer and impact modifier, and (ii) between 2 and 10 weight percent (wt %) based on the weight of the composition of platelet mineral filler, e.g., talc. The composition of this embodiment is useful for, among other things, the preparation of a non-foam layer of a multi-layer article, e.g., the inner or inside layer of a three-layer pipe.

In another embodiment, the invention is a mineral-filled, polypropylene composition comprising (i) a coupled, impact propylene copolymer, and/or a coupled blend of polypropylene homopolymer and impact modifier, and (ii) between 5 to 25 weight percent (wt %) based on the weight of the composition of non-platelet mineral filler, e.g., calcium carbonate. The composition of this embodiment is useful for, among other things, the preparation of a non-foam layer of a multi-layer article, e.g., the inner or inside layer of a three-layer pipe.

In another embodiment, the invention is a mineral-filled, polypropylene composition comprising (i) a coupled, impact propylene copolymer, and/or a coupled blend of polypropylene homopolymer and impact modifier, and (ii) at least 10 weight percent (wt %) based on the weight of the composition of a two-component mineral filler in which one component is a platelet filler, talc, and the other component is a non-platelet filler, e.g., calcium carbonate. The platelet and non-platelet fillers are present in a weight ratio of between 1:15 to 1:3. The composition of this embodiment is useful for, among other things, the preparation of a non-foam layer of a multi-layer article, e.g., the inner or inside layer of a three-layer pipe.

In another embodiment, the invention is a mineral-filled, polypropylene composition comprising (i) a coupled, impact propylene copolymer, and/or a coupled blend of polypropylene homopolymer and impact modifier, and (ii) at least 40 weight percent (wt %) based on the weight of the composition of a mineral filler, e.g., calcium carbonate and/or talc. In another embodiment, the amount of filler in this composition is from 40 to 80, preferably from 45 to 70 and more preferably from 50 to 60, wt % based on the total weight of the composition. The composition of this embodiment is useful for, among other things, the preparation of a non-foam layer of a multi-layer article, e.g., the outer or outside layer of a three-layer pipe.

In another embodiment, the invention is a mineral-filled, polypropylene composition comprising (i) a coupled, impact propylene copolymer, and/or a coupled blend of polypropylene homopolymer and impact modifier, (ii) at least 50 weight percent (wt %) based on the weight of the composition of a non-platelet mineral filler, e.g., calcium carbonate. The composition of this embodiment is useful for, among other things, the preparation of a non-foam layer of a multi-layer article, e.g., the outer or outside layer of a three-layer pipe.

The coupled impact propylene copolymer and/or coupled blend of polypropylene homopolymer and impact modifier is formed by the reaction of a coupling agent, e.g., an azide, having at least two reactive groups that are each capable of forming a carbene or nitrene group with the impact propylene polymer or the blend. Typically and preferably, the coupled, impact propylene copolymer or blend comprises a propylene homopolymer or copolymer continuous phase and an elastomeric polymer dispersed (discontinuous) phase.

In another aspect the invention is a three-layer pipe comprising:

A. A first or outer or outside non-foam layer;
B. A second or middle or core foam layer; and
C. A third or inner or inside non-foam layer;

The first and second layers comprising a mineral-filled, coupled impact propylene copolymer comprising (i) a coupled, impact propylene copolymer, and/or a coupled blend of polypropylene homopolymer and impact modifier, and (ii) at least 0.5 weight percent (wt %) based on the weight of the composition of at least one of calcium carbonate and talc. For the foam layer, the mineral is preferably a platelet filler, e.g., talc. For the outer layer, the mineral is preferably calcium carbonate.

In one embodiment the invention is an article, e.g., a thermoformed sheet, made from a mineral-filled, polypropylene composition comprising (i) a coupled, impact propylene copolymer, and/or a coupled blend of polypropylene homopolymer and impact modifier, (ii) at least 25 weight percent (wt %) based on the weight of the composition of at least one mineral filler, and (iii) a foaming agent, e.g., an azide. In one embodiment the invention is an article, e.g., a thermoformed sheet, made from a mineral-filled, polypropylene composition comprising (i) a coupled, impact propylene copolymer, and/or a coupled blend of polypropylene homopolymer and impact modifier, and (ii) at least one mineral filler, e.g., talc and/or calcium carbonate.

DETAILED DESCRIPTION OF THE PREFERRED EMBODIMENT

All references to the Periodic Table of the Elements refer to the Periodic Table of the Elements published and copyrighted by CRC Press, Inc., 2003. Also, any references to a Group or Groups shall be to the Group or Groups reflected in this Periodic Table of the Elements using the IUPAC system for numbering groups. Unless stated to the contrary, implicit from the context, or customary in the art, all parts and percents are based on weight and all test methods are current as of the filing date of this disclosure. For purposes of United States patent practice, the contents of any referenced patent, patent application or publication are incorporated by reference in their entirety (or its equivalent US version is so incorporated by reference) especially with respect to the disclosure of synthetic techniques, definitions (to the extent not inconsistent with any definitions specifically provided in this disclosure), and general knowledge in the art.

The numerical ranges in this disclosure are approximate, and thus may include values outside of the range unless otherwise indicated. Numerical ranges include all values from and including the lower and the upper values, in increments of one unit, provided that there is a separation of at least two units between any lower value and any higher value. As an example, if a compositional, physical or other property, such as, for example, molecular weight, monomer content, melt flow rate, etc., is from 100 to 1,000, it is intended that all individual values, such as 100, 101, 102, etc., and sub ranges, such as 100 to 144, 155 to 170, 197 to 200, etc., are expressly enumerated. For ranges containing values that are less than one or containing fractional numbers greater than one (e.g., 1.1, 1.5, etc.), one unit is considered to be 0.0001, 0.001, 0.01 or 0.1, as appropriate. For ranges containing single digit numbers less than ten (e.g., 1 to 5), one unit is typically considered to be 0.1. These are only examples of what is specifically intended, and all possible combinations of numerical values between the lowest value and the highest value enumerated, are to be considered to be expressly stated in this disclosure. Numerical ranges are provided within this disclosure for, among other things, ethylene content, long chain branching, isotacticity, molecular weight, melt flow rate and various process parameters.

The term "comprising" and its derivatives are not intended to exclude the presence of any additional component, step or procedure, whether or not the same is specifically disclosed. In order to avoid any doubt, all compositions claimed through use of the term "comprising" may include any additional additive, adjuvant, or compound whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed. The term "or", unless stated otherwise, refers to the listed members individually as well as in any combination.

As used with respect to a chemical compound, unless specifically indicated otherwise, the singular includes all isomeric forms and vice versa (for example, "hexane", includes all isomers of hexane individually or collectively). The terms "compound" and "complex" are used interchangeably to refer to organic-, inorganic- and organometal compounds. The term, "atom" refers to the smallest constituent of an element regardless of ionic state, that is, whether or not the same bears a charge or partial charge or is bonded to another atom. The term "heteroatom" refers to an atom other than carbon or hydrogen. Preferred heteroatoms include: F, Cl, Br, N, O, P, B, S, Si, Sb, Al, Sn, As, Se and Ge. The term "amorphous" refers to a polymer lacking a crystalline melting point as determined by differential scanning calorimetry (DSC) or equivalent technique.

"Blend," "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art.

The term "polymer" refers to a macromolecular compound prepared by polymerizing one or more monomers. A polymer refers to homopolymers, copolymers, terpolymers, interpolymers, and so on. The term "interpolymer" is used interchangeably with the term copolymer to refer to polymers incorporating in polymerized form at least two copolymerizable monomers, or incorporating long chain branching as a result of chain termination/olefin formation reactions in situ, and re-incorporation of the in situ formed olefin. Accordingly, copolymers may result from the polymerization of a single monomer, under the correct operating conditions. The least prevalent monomer or monomers in the resulting interpolymer are generally referred to by the term "comonomer". The chain length of the resulting long chain branches referred to above, is consequently longer than the carbon length resulting from polymerization of any deliberately added comonomer, and in particular, is longer than 1 carbon for propylene/ethylene copolymers. The presence of long chain branching may also be detected by the increased shear sensitivity of the polymer, as disclosed in EP-A-608,369, and elsewhere, or determined by Melt index Ratio (MIR), a ratio of polymer melt viscosities measured under differing loads, especially $I_{10}/I_2$.

Differential scanning calorimetry (DSC) is a common technique that can be used to examine the melting and crystallization of semi-crystalline polymers. General principles of DSC measurements and applications of DSC to studying semi-crystalline polymers are described in standard texts (for instance, E. A. Turi, ed., "Thermal Characterization of Polymeric Materials", Academic Press, 1981).

The term "crystallinity" refers to the regularity of the arrangement of atoms or molecules forming a crystal structure. Polymer crystallinity can be examined using DSC. $T_{me}$ means the temperature at which the melting ends and $T_{max}$ means the peak melting temperature, both as determined by one of ordinary skill in the art from DSC analysis using data from the final heating step. One suitable method for DSC analysis uses a model Q1000™ DSC from TA Instruments, Inc. Calibration of the DSC is performed in the following manner. First, a baseline is obtained by heating the cell from −90° C. to 290° C. without any sample in the aluminum DSC pan. Then 7 milligrams of a fresh indium sample is analyzed by heating the sample to 180° C., cooling the sample to 140° C. at a cooling rate of 10° C./min followed by keeping the sample isothermally at 140° C. for 1 minute, followed by heating the sample from 140° C. to 180° C. at a heating rate of 10° C./min. The heat of fusion and the onset of melting of the indium sample are determined and checked to be within 0.5° C. from 156.6° C. for the onset of melting and within 0.5 J/g from 28.71 J/g for the heat of fusion. Then deionized water is analyzed by cooling a small drop of fresh sample in the DSC pan from 25° C. to −30° C. at a cooling rate of 10° C./min. The sample is kept isothermally at −30° C. for 2 minutes and heated to 30° C. at a heating rate of 10° C./min. The onset of melting is determined and checked to be within 0.5° C. from 0° C.

Samples of polymer are pressed into a thin film at a temperature of 177° C. About 5 to 8 mg of sample is weighed out and placed in a DSC pan. A lid is crimped on the pan to ensure a closed atmosphere. The sample pan is placed in the DSC cell and then heated at a high rate of about 100° C./min to a temperature of 230° C. The sample is kept at this temperature for about 3 minutes. Then the sample is cooled at a rate of 10° C./min to −40° C., and kept isothermally at that temperature for 3 minutes. Consequently the sample is heated at a rate of 10° C./min until melting is complete. The resulting enthalpy curves are analyzed for peak melt temperature, onset and peak crystallization temperatures, heat of fusion and heat of crystallization, $T_{me}$, $T_{max}$, and any other quantity of interest from the corresponding thermograms as described in U.S. Pat. No. 6,960,635. The factor that is used to convert heat of fusion into nominal weight percent crystallinity is 165 J/g=100 wt % crystallinity. With this conversion factor, the total crystallinity of a propylene-based copolymer (units: weight percent crystallinity) is calculated as the heat of fusion divided by 165 J/g and multiplied by 100 percent.

"Polypropylene" or "propylene polymer" means a polymer having at least half of its mer units derived from propylene. These include homopolymers of propylene as well as copolymers of propylene with one or more monomers with which it (i.e., propylene) is copolymerizable such as ethylene, 1-butene, 1-pentene, 1-hexene, 1-octene, one or more conjugated or non-conjugated dienes, and combinations of two or more of these comonomers.

"Polymerization conditions" generally refer to temperature, pressure, monomer content (including comonomer concentration), catalyst concentration, cocatalyst concentration, monomer conversion, polymer (or solids) content of the reaction mixture or other conditions that influence the properties of the resulting polymer. By operation according to the prescribed polymerization conditions of the invention, high molecular weight polymers may be prepared with high catalyst activities, low cocatalyst usage, high monomer conversion, and high reactor solids content. In particular, activities (based on weight of polymer to weight of transition metal) greater than 0.3, preferably greater than 0.5 and even greater than 0.6, grams per microgram (g/µg) are possible.

The ability to extrude crystalline polymers efficiently is inhibited due their high heat capacity. Mineral filler not only improves the physical and/or mechanical properties of polymers, it also improves the thermal properties of the polymer such that crystalline polymers extrude efficiently. Heat capacity is the ability of a material to absorb heat. Heat capacity is measured in Joules per gram. Heat capacity is the amount of heat needed to raise the temperature of a given substance and its mass one degree Centigrade. Heat capacity also identifies the energy or heat released to lower the temperature and mass of a substance. For plastic pipe extrusion this is important and the lower the heat capacity in the range of ambient temperature to the melting temperature suitable for pipe extrusion defines the speed in which pipe can be extruded. The lower the heat capacity the less energy required to heat the pipe extrusion polymer and the less energy to be removed. In terms of cooling the extruded pipe, less energy is needed for cooling water baths or chambers. For a polymer with a low heat capacity, less cooling capacity is required which reduces cost and space.

Unfilled, coupled, impact propylene copolymer and/or a coupled blend of polypropylene homopolymers and impact modifier typically exhibit high heat capacity and low extrusion rates. Mineral fillers have low heat capacities and higher densities than coupled, impact propylene copolymer, and/or a coupled blend of polypropylene homopolymers and impact modifier.

The method to measure heat capacity is as follows. Empty open aluminum hermetic (P/N 900793.901 pan) Differential Scanning calorimeter (DSC) pan bottoms are placed in the reference and sample DSC cell and scanned for a baseline. The same pans are scanned with a weighed NIST Standard Reference Material 720 Sapphire Heat Capacity pellet. The sapphire pellets weigh between 20-30 milligrams each. The sapphire pellets are removed and replaced with a weighed sample and scanned. Sample weights are roughly 10 milligrams. The samples are scanned in a TA Instruments Q2000 DSC (P/N 970001.901) (SN 2000.0877) with an auto sampler, nitrogen purge of 50 ml/min and mechanical cooling accessory. The parameters for all the scans are equilibrate at 225° C., 225° C. to −50° C. at 20° C./min, equilibrate at −50° C., ramp −50° C. to 270° C. at 20° C./min with a sampling interval of 0.10 sec/pt with data collected only on the last heat cycle. The scans are analyzed using Universal Analysis V4.3A TA Instruments software.

As mineral filler is added, the heat capacity of unfilled coupled, impact propylene copolymer, and/or a coupled blend of polypropylene homopolymers and impact modifier occurs is reduced and the physical properties of the resin increased. The heat capacity of the resins are measured over for the temperature range of 37.7° C. to 218.3° C., i.e., the temperature range required to melt the polymer and to extrude high quality pipe.

The heat capacity area under the curve is integrated from 37.7° C. to 218.3° C. from the baseline at 0.00 J/gm C. The heat required to extruded pipe is obtained by summing the heat capacity over the range of 37.7° C. to 218.3° C. and adding the heat of melting.

The heat capacity term is extrapolated through the melt region, and the heat of fusion for melting is added to obtain the total heat required to heat the resin for extrusion. The heat required to melt a coupled, impact propylene copolymer which contains 10% calcium carbonate by weight is 540.7 J/gm and is reduced to 316.7 J/gm when 60% calcium carbonate by weight is added to a coupled, impact propylene copolymer. This represents a significant increase in extrusion rates for pipe and other extrudates.

As another example, the heat capacity at 120° C. of a coupled, impact propylene copolymer which contains 10% calcium carbonate by weight is 2.72 J/gm and is reduced to 1.64 J/gm when 60% calcium carbonate by weight is added to a coupled, impact propylene copolymer. This represents a reduction in heat capacity and a significant increase in pipe extrusion rates.

Heat stabilization is achieved by utilizing a combination of organophoshite, hindered phenolic and dialkyl ester of thiodipropionic acid to stabilize the preferred mineral filled coupled, impact propylene copolymer, and/or a coupled blend of polypropylene homopolymers and impact modifier.

To insure the long term quality and function of a piping system, the physical properties are evaluated for the highest use temperature of a piping system. Piping systems in buildings will be exposed to intermittent heats up to 71.1° C. or 160° F. Accelerated heat stability testing is achieved by exposing ASTM D 638 Standard Test Method for Tensile Properties of Plastics type 1 tensile bar specimens to 130° C., 140° C., 150° C., and 160° C. temperatures in a recirculating air oven. Specimens are removed from the oven and tested for tensile strength, tensile modulus, and Izod impact strength at 23° C. This method is similar to the relative thermal index per Underwriters Laboratory UL 746B Polymeric Material— Long Term Property Evaluations method. The failure criterion is the loss of 50% of the original resin properties.

Utilizing ASTM D 2837 failure is determined by the sharp transition knee from sustained strength to the loss of strength. The knee represents the aging time at which 50% of the strength is lost. Data points are determined by the aging time and aging temperature. ASTM D 2837 is utilized to extrapolate to highest use temperature of 71.1° C. at which the log (aging temperature) vs. log (aging failure time) is utilized. Assuming 71.1° C. for 24 hours per day, the expected lifetime per ASTM D 2837 is 44 years. Utilizing the same data and utilizing the Arrhenius equation for tensile and Izod impact data and assuming 71.1° C. for 24 hours per day the expected lifetime is 207 years. The Arrhenius equation is an empirical relationship utilized to model thermally-induced processes/reactions. Considering the results of both methods, the useful lifetime of thermally stabilized, coupled, impact propylene copolymer, and/or a coupled blend of polypropylene homopolymers and impact modifier exceed the requirements of standard drain waste and vent piping applications.

The impact propylene polymers used in the practice of this invention have a continuous phase, which is comprised of a propylene polymer, and an elastomeric phase. The propylene polymer of the continuous phase typically will be a homopolymer propylene polymer or a random or mini-random propylene copolymer, more typically a homopolymer propylene polymer. The propylene polymer may be made using a Ziegler-Natta catalyst, constrained geometry catalyst, metallocene catalyst, or any other suitable catalyst system. When the propylene polymer making up the continuous phase is a homopolymer propylene polymer, the crystallinity of the propylene polymer, as determined by differential scanning calorimetry, is preferably at least about 50 percent, more preferably at least about 55 percent, most preferably at least about 62 percent. The methods for determining percent crystallinity using a differential scanning calorimetry are known to one of skill in the art.

The elastomeric phase may be made using a constrained geometry catalyst, Ziegler-Natta catalyst, metallocene catalyst or any other suitable catalyst. Ethylene propylene rubbers are typically made in the second of two reactors coupled in series. Preferred blended elastomers include, but are not limited to, ethylene-octene, ethylene-butylene and ethylene-hexene. Typically, the elastomeric content of the impact propylene copolymer or the blend is from 8 to 40, more typically from 12 to 25 and most typically from 15 to 22 wt % based on the weight of the copolymer or blend.

Certain impact propylene copolymers that can be used in the practice of this invention are more fully described in U.S. Pat. Nos. 6,472,473 and 6,841,620.

The preferred coupling agent is a poly(sulfonyl azide), more preferably a bis(sulfonyl azide). Examples of poly(sulfonyl azides) useful for the invention are described in WO 99/10424. Poly(sulfonyl)azides include such compounds as 1,5-pentane bis(sulfonyl azide), 1,8-octane bis(sulfonyl azide), 1,10-decane bis(sulfonyl azide), 1,10-octadecane bis(sulfonyl azide), 1-octyl-2,4,6-benzene tris(sulfonyl azide), 4,4'-diphenyl ether bis(sulfonyl azide), 1,6-bis(4'-sulfonazidophenyl)hexane, 2,7-naphthalene bis(sulfonyl azide), and mixed sulfonyl azides of chlorinated aliphatic hydrocarbons containing an average of from 1 to 8 chlorine atoms and from 2 to 5 sulfonyl azide groups per molecule, and mixtures of two or more of these compounds. Preferred poly(sulfonyl azide)s include oxy-bis(4-sulfonylazidobenzene), 2,7-naphthalene bis(sulfonyl azido), 4,4'-bis(sulfonyl azido)biphenyl, 4,4'-diphenyl ether bis(sulfonyl azide) and bis(4-sulfonyl azidophenyl)methane, and mixtures thereof.

Sulfonyl azides are commercially available or are conveniently prepared by the reaction of sodium azide with the corresponding sulfonyl chloride, although oxidation of sulfonyl hydrazines with various reagents (nitrous acid, dinitrogen tetroxide, nitrosonium tetrafluoroborate) has been used.

The process to produce the impact propylene copolymer involves coupling of the impact propylene copolymer using a coupling agent. The coupling reaction is implemented via reactive extrusion or any other method which is capable of mixing the coupling agent with the impact propylene copolymer and adding sufficient energy to cause a coupling reaction between the coupling agent and the impact propylene copolymer. Preferably, the process is carried out in a single vessel such as a melt mixer or a polymer extruder, such as described in U.S. Ser. No. 09/133,576 filed Aug. 13, 1998. The amount of coupling agent employed can and will vary with the nature and relative amounts of reagents, but is ultimately determined by the desired melt strength, viscosity and drawability of the melt. This amount typically is between 0.00005 and 0.01 parts based on the total weight of the reagents. The term extruder is intended to include its broadest meaning and includes such devices as a device which extrudes pellets as well as an extruder which produces the extrudate for forming into films, blow molded articles, profile and sheet extruded articles, foams and other articles.

Fillers may be employed to obtain optimized combinations of toughness, stiffness, heat distortion temperature and linear thermal expansion in the propylene polymer compositions according to the present invention. Usually, the propylene polymer compositions comprise filler such as calcium carbonate, talc, clay, mica, wollastonite, hollow glass beads, silica or fumed silica. Preferred fillers are talc and calcium carbonate and these are generally known fillers for various polymeric resins. See for example U.S. Pat. Nos. 5,091,461 and 3,424,703; EP 639,613 A1; and EP 391,413, where these and other materials and their suitability as filler for polymeric resins are generally described.

In one embodiment, the talcs and carbonates are uncalcined and have very low free metal oxide content. The mineral talcs best suited are hydrated magnesium silicates as generally represented by the theoretical formula

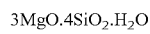

The composition of the talc may vary somewhat with locality in which it is mined. Montana talcs, for example, closely approach this theoretical composition. Suitable mineral talcs of this type are commercially available as JETFIL™ 700C available from Luzenac. The talcs can be compacted or uncompacted, and/or calcined or uncalcined. The surface of the calcium carbonate can be treated or untreated, coated or uncoated.

The suitability of platelet fillers in maintaining the preferred levels of toughness and stiffness of molded articles prepared from the resin has been found to be a function of the average L/T of the filler particles together with obtaining uniformly small particle-sized filler. Typical are those compositions incorporating platelet fillers having an average L/T as measured according to the below-described techniques of at least 1, more typically at least 10, more typically at least 15. With regard to the maximum level for the L/T ratio, a typical maximum is 50, more typically up to and including about 40, still more typically up to and including about 30.

The particle size of the fillers can vary widely. Typically, the mean particle size of a non-platelet filler is from 0.2 to 3, more typically from 0.5 to 2 and still more typically from 0.8 to 1.5, microns. Typically, the mean particle size of platelet filler is from 0.1 to 3, more typically from 0.5 to 2.5 and still more typically from 1 to 2, micron.

For determining the particle size and L/T ratio, the length of the fillers (or longest dimension, such as the diameter of a plate-shaped particle) as well as their thickness (shortest dimension of the 2 dimensions measurable) are measured using any one of a number of well-known techniques, including sedimentation (e.g., Sedigraph) and microscopy.

Further, the claimed propylene polymer compositions may also optionally contain one or more additives that are commonly used in propylene polymer compositions of this type. Preferred additives of this type include, but are not limited to: ignition resistant additives, heat stabilizers, UV-stabilizers, colorants, antioxidants, antistatic agents, flow enhancers, mold releases, acid scavengers such as metal stearates (e.g., calcium stearate, magnesium stearate), nucleating agents, tracers and the like. Preferred examples of additives are ignition resistance additives, such as, but not limited to halogenated hydrocarbons, halogenated carbonate oligomers, halogenated diglycidyl ethers, organo-phosphorous compounds, fluorinated olefins, antimony oxide and metal salts of aromatic sulfur, or a mixture thereof may be used. Further, compounds which stabilize polymer compositions against degradation caused by, but not limited to heat, light, and oxygen, or a mixture thereof may be used.

If used, such additives may be present in an amount from at least 0.001, preferably at least 0.05 and more preferably at least 0.1, percent by weight based on the total weight of the composition. Generally, the additive is present in an amount less than or equal to 3, preferably less than or equal to 2 and more preferably less than or equal to 1, percent by weight based on the total weight of composition.

Preparation of the Propylene Polymer Compositions of this Invention can be accomplished by any suitable mixing means known in the art, including dry blending the individual components and subsequently melt mixing, either directly in the extruder used to make the finished article (e.g., pipe), or pre-mixing in a separate melt mixer (e.g., a Banbury mixer) or extruder (e.g., twin-screw extruder).

The propylene polymer compositions of the present invention are thermoplastic. When softened or melted by the application of heat, the polymer blend compositions of this invention can be formed or molded using conventional techniques such as compression molding, injection molding, gas assisted injection molding, calendering, vacuum forming, thermoforming, extrusion and/or blow molding, alone or in combination. The polymer blend compositions can also be formed, spun, or drawn into films, fibers, tapes, multi-layer laminates or extruded sheets, or can be compounded with one or more organic or inorganic substances, on any machine suitable for such purpose. The propylene polymer compositions of the present invention are preferably extruded.

In one embodiment, the invention is a three-layer pipe comprising a first or outer layer, a second or middle or center layer, and a third or inner layer. The outer layer provides high rigidity, pigment color for market identification, UV-resistance, heat stability and good interfacial adhesion. The middle (foamed) layer provides low weight, low cost, rigidity, impact strength, heat stability and good interfacial adhesion. The inner layer provides chemical resistance, impact strength and elongation, heat stability, impermeability and good interfacial adhesion.

The multi-layer pipe of this invention is prepared using know methods and techniques, such as those taught in U.S. Pat. No. 6,176,269.

The overall thickness of the pipe wall is typically between 0.14 and 0.35 inches (in.). Of this overall thickness, typically the thickness of outer layer is between 3.5 and 20 percent, the thickness of the middle layer is typically between 60 and 93 percent, and the thickness of the inner layer is between 3.5 and 20 percent.

The composition of each layer typically comprises:

Outside Layer

| Component | Broad (wt %) | Preferred (wt %) | More Preferred (wt %) |
| --- | --- | --- | --- |
| Polypropylene Composition | 30-80 | 30-55 | 35-45 |
| Calcium Carbonate | 20-70 | 45-70 | 55-65 |
| Talc | 0-10 | 0-5 | 0 |
| UV Stabilizer | 0-3 | 0.1-1 | 0.3-0.5 |
| Heat Stabilizer | 0-1 | 0.1-0.5 | 0.2-0.4 |
| Antioxidant | 0.05-1 | 0.2-0.6 | 0.3-0.5 |
| Pigment | 0.05-1 | 0.1-1 | 0.3-0.5 |

Middle Layer

| Component | Broad (wt %) | Preferred (wt %) | More Preferred (wt %) |
| --- | --- | --- | --- |
| Polypropylene Composition | 30-75 | 40-60 | 45-55 |
| Calcium Carbonate | 25-60 | 30-50 | 40-45 |
| Talc | 0.5-10 | 2-10 | 5-10 |
| UV Stabilizer | 0-3 | 0-1 | 0-0.5 |
| Heat Stabilizer | 0-1 | 0.1-0.5 | 0.2-0.4 |
| Antioxidant | 0.05-1 | 0.2-0.6 | 0.3-0.5 |
| Foaming Agent | 0.05-2 | 0.1-1 | 0.2-0.6 |
| Pigment | 0-3 | 0-1 | 0-0.5 |

Inner Layer

| Component | Broad (wt %) | Preferred (wt %) | More Preferred (wt %) |
| --- | --- | --- | --- |
| Polypropylene Composition | 30-100 | 70-98 | 70-85 |
| Calcium Carbonate | 0-60 | 0-30 | 10-20 |
| Talc | 0-10 | 2-10 | 5-10 |

Inner Layer

| Component | Broad (wt %) | Preferred (wt %) | More Preferred (wt %) |
| --- | --- | --- | --- |
| UV Stabilizer | 0-3 | 0-1 | 0-0.5 |
| Heat Stabilizer | 0-1 | 0.1-0.5 | 0.2-0.4 |
| Antioxidant | 0.05-1 | 0.2-0.6 | 0.3-0.5 |
| Pigment | 0-3 | 0-1 | 0-0.5 |

The polypropylene composition comprises a coupled, impact propylene copolymer, and/or a coupled blend of polypropylene homopolymer and impact modifier. The polypropylene composition may or may not contain other additives such as a crystallization nucleator to aid in the crystallization of the polymer during cooling.

The cell size of the foam of the middle layer is typically and preferably small and uniform in size. Typical cell size ranges between 50 and 550, preferably between 50 and 250 and more preferably between 50 and 150, microns. The typical cell aspect ratio, i.e., cell length to cell width, is between 1:1 and 1:2, with aspect ratios closer to 1:1 preferred. Both chemical and physical foaming agents can be used in the practice of this invention, and azodicarbonamide is representative of a chemical foaming agent. Preferably the coupled propylene polymer composition from which the foam core is made comprises (A) either (i) a coupled impact copolymer with an MFR of 0.2 to 10, a rubber content of 10-40 wt % and an ethylene content of the rubber of 30-70 wt %, or (ii) a coupled compounded blend of homopolymer of polypropylene and an elastomer of either ethylene-octene or branched ethylene-butene at a polypropylene to elastomer weight ratio of 90:10 to 60:40, and (B) at least 25.5 wt % filler. The filled, coupled polymer preferably has a melt strength between greater than 15 up to 26 centiNewtons (cN) as measure by the Rheotens test, a drawability of 95-110 millimeters per second (mm/sec), and a viscosity of 27,000 to 48,000 Pa-sec at 0.5 radians/sec and 180° C., more preferably between 27,000 and 38,000. The heat capacity and foamability of the filled, coupled propylene polymer of this invention is also superior to that of traditional high melt strength propylene polymers.

The three layer pipe of this invention compares well with pipe comprising either ABS or PVC. The pipe of this invention has cold impact strength similar to that of a pipe made of ABS and much greater than that of a pipe made from PVC. It has room temperature impact strength similar to that of a pipe made of PVC and ABS. It has a heat distortion temperature (190-204° F.) better than both that of pipes made from PVC (158-170° F.) and ABS (less than 180° F.). Moreover, the modulus of the inventive pipe is about the same as ABS, and it has a coefficient of thermal expansion much less than that of pipe made with unfilled (natural) polypropylenes and equal to or less than that of PVC pipe.

In one embodiment the invention is a mineral-filled, polypropylene composition comprising (i) a coupled blend of polypropylene homopolymer and impact modifier, (ii) at least 25 weight percent (wt %) based on the weight of the composition of at least one mineral filler, and (iii) a foaming agent.

In one embodiment the invention is a composition in which the mineral filler is at least one of a platelet filler and a non-platelet filler, and the amount of mineral filler in the composition is from 28 to 60 wt % based on the total weight of the composition.

In one embodiment the invention is a composition in which the mineral filler comprises a platelet filler and a non-platelet filler, and the amount of mineral filler in the composition is from 28 to 60 wt % based on the total weight of the composition.

In one embodiment the invention is a composition in which the platelet filler and the non-platelet filler are present in a weight ratio between 1:30 and 1:3.

In one embodiment the invention is a composition in which the mean particle size of the non-platelet filler is from 0.2 to 3 microns, the mean particle size of the platelet filler is from 0.1 to 3 microns, and the length to thickness (L/T) ratio of the platelet filler is between 1 and 50.

In one embodiment the invention is a composition in which the platelet filler comprises talc and the non-platelet filler comprises calcium carbonate.

In one embodiment the invention is a composition in which the polypropylene homopolymer has a crystallinity of at least 50 percent.

In one embodiment the invention is a composition in which the impact modifier comprises from 8 to 40 wt % of the coupled blend.

In one embodiment the invention is a composition in which the coupled impact propylene copolymer, or coupled blend of polypropylene homopolymer and impact modifier, is formed by the reaction of (i) a coupling agent having at least two reactive groups that are each capable of forming a carbene or nitrene group, and (ii) an impact propylene polymer.

In one embodiment the invention is a composition in which the coupling agent is an azide.

In one embodiment the invention is a composition in which the foaming agent is a chemical foaming agent.

In one embodiment the invention is a composition in which the foaming agent is azodicarbonamide.

In one embodiment the invention is a composition as described above further characterized as having at least one of a (i) melt strength between greater than 15 to 26 cN as measured by Rheotens test, (ii) drawability of 95-110 mm/sec, and (iii) viscosity of 27,000 to 48,000 Pa-sec at 0.5 radians/sec and 180° C.

In one embodiment the invention is a mineral-filled, polypropylene composition comprising (i) a coupled blend of a polypropylene homopolymer and an impact modifier, and (ii) between 2 and 10 wt % based on the weight of the composition of a platelet mineral filler.

In one embodiment the invention is a mineral-filled, polypropylene composition in which the mean particle size of the platelet filler is from 0.1 to 3 microns and the length to thickness (L/T) ratio of the platelet filler is between 1 and 50.

In one embodiment the invention is a mineral-filled, polypropylene composition in which the platelet filler comprises talc.

In one embodiment the invention is a mineral-filled, polypropylene composition in which the polypropylene homopolymer has a crystallinity of at least 50 percent.

In one embodiment the invention is a mineral-filled, polypropylene composition in which the impact modifier comprises from 8 to 40 wt % of the coupled blend.

In one embodiment the invention is a mineral-filled, polypropylene composition in which the coupled blend of polypropylene homopolymer and impact modifier, is formed by the reaction of (i) a coupling agent having at least two reactive groups that are each capable of forming a carbene or nitrene group, and (ii) an impact propylene polymer.

In one embodiment the invention is a mineral-filled, polypropylene composition comprising (i) a coupled blend of polypropylene homopolymer and impact modifier, and (ii) from 5 to 25 weight percent (wt %) based on the weight of the composition of non-platelet mineral filler.

In one embodiment the invention is a mineral-filled, polypropylene composition in which the mean particle size of the non-platelet filler is from 0.2 to 3 microns.

In one embodiment the invention is a mineral-filled, polypropylene composition in which the non-platelet filler comprises calcium carbonate.

In one embodiment the invention is a mineral-filled, polypropylene composition in which the polypropylene homopolymer has a crystallinity of at least 50 percent.

In one embodiment the invention is a mineral-filled, polypropylene composition in which the impact modifier comprises from 8 to 40 wt % of the coupled blend.

In one embodiment the invention is a mineral-filled, polypropylene composition in which the coupled blend of polypropylene homopolymer and impact modifier is formed by the reaction of (i) a coupling agent having at least two reactive groups that are each capable of forming a carbene or nitrene group, and (ii) an impact propylene polymer.

In one embodiment the invention is a mineral-filled, polypropylene composition comprising (i) a coupled blend of polypropylene homopolymer and impact modifier, and (ii) at least 10 weight percent (wt %) based on the weight of the composition of a two-component mineral filler in which one component is a platelet filler and the other component is a non-platelet filler.

In one embodiment the invention is a mineral-filled, polypropylene composition in which the platelet and non-platelet fillers are present in a weight ratio between 1:15 and 1:3.

In one embodiment the invention is a mineral-filled, polypropylene composition in which the mean particle size of the non-platelet filler is from 0.2 to 3 microns, the mean particle size of the platelet filler is from 0.1 to 3 microns and the length to thickness (L/T) ratio of the platelet filler is between 1 and 50.

In one embodiment the invention is a mineral-filled, polypropylene composition in which the platelet filler comprises talc and the non-platelet filler comprises calcium carbonate.

In one embodiment the invention is a mineral-filled, polypropylene composition in which the polypropylene homopolymer has a crystallinity of at least 50 percent.

In one embodiment the invention is a mineral-filled, polypropylene composition in which the impact modifier comprises from 8 to 40 wt % of the coupled blend.

In one embodiment the invention is a mineral-filled, polypropylene composition in which the coupled blend of polypropylene homopolymer and impact modifier, is formed by the reaction of (i) a coupling agent having at least two reactive groups that are each capable of forming a carbene or nitrene group, and (ii) an impact propylene polymer.

In one embodiment the invention is a mineral-filled, polypropylene composition comprising (i) a coupled blend of polypropylene homopolymer and impact modifier, and (ii) at least 25, preferably at least 40, wt % based on the weight of the composition of a mineral filler.

In one embodiment the invention is a mineral-filled, polypropylene composition in which the mineral filler is at least one of a platelet filler and a non-platelet filler, and the amount of mineral filler in the composition is from 45 to 70 wt % based on the total weight of the composition.

In one embodiment the invention is a mineral-filled, polypropylene composition in which the mineral filler comprises a platelet filler and a non-platelet filler, and the amount of mineral filler in the composition is from 45 to 70 wt % based on the total weight of the composition.

In one embodiment the invention is a mineral-filled, polypropylene composition in which the platelet filler and the non-platelet filler are present in a weight ratio between 1:30 and 1:3.

In one embodiment the invention is a mineral-filled, polypropylene composition in which the mean particle size of the non-platelet filler is from 0.2 to 3 microns, the mean particle size of the platelet filler is from 0.1 to 3 microns, and the length to thickness (L/T) ratio of the platelet filler is between 1 and 50.

In one embodiment the invention is a mineral-filled, polypropylene composition in which the platelet filler comprises talc and the non-platelet filler comprises calcium carbonate.

In one embodiment the invention is a mineral-filled, polypropylene composition in which the filler is a non-platelet filler and comprises at least 50 wt % of the composition.

In one embodiment the invention is a mineral-filled, polypropylene composition in which the non-platelet filler is calcium carbonate.

In one embodiment the invention is a mineral-filled, polypropylene composition in which the polypropylene homopolymer has a crystallinity of at least 50 percent.

In one embodiment the invention is a mineral-filled, polypropylene composition in which the impact modifier comprises from 8 to 40 wt % of the coupled blend.

In one embodiment the invention is a mineral-filled, polypropylene composition in which the coupled blend of polypropylene homopolymer and impact modifier, is formed by the reaction of (i) a coupling agent having at least two reactive groups that are each capable of forming a carbene or nitrene group, and (ii) an impact propylene polymer.

In one embodiment the invention is an article comprising any of the compositions as described in the preceding embodiments.

In one embodiment the invention is an article comprising any of the compositions as described in the preceding embodiments in the form of a pipe.

In one embodiment the invention is an article comprising any of the compositions as described in the preceding embodiments in the form of a thermoformed sheet.

The following examples further illustrate the invention. Unless otherwise noted, all parts and percentages are by weight.

Specific Embodiments

Table 1 reports the polymer compositions used to manufacture the 3-layer pipes of Examples 1-7. Polymer compositions for the extrusion of pipe are compounded in a Farrel continuous mixer. Components, such as fillers and additives, are fed into the mixer via feeders and/or a combination of dry blends of more than one additive or filler. Successful compounding of polymer compositions for the extrusion of pipe can also be compounded in a single screw extruder. Table 2 reports the test methods used to measure various properties of the compositions. Table 3 reports various properties of the compositions.

TABLE 1

Polymer Compositions* Used in the Manufacture of 3-Layer Pipe

| Composition Number | INSPIRE D114** (wt %) | Jetfil 700C*** (wt %) | Calcium Carbonate+ (wt %) | Azodicarbonamide Blowing Agent++ (wt %) |
|---|---|---|---|---|
| 1 | 99.636 | 0 | 0 | 0 |
| 2 | 49.036-49.236 | 5 | 45 | 0.2-0.4 |
| 3 | 39.436 | 0 | 60 | 0 |
| 4 | 89.436 | 0 | 10 | 0 |
| 5 | 79.436 | 0 | 20 | 0 |
| 6 | 92.436 | 7 | 0 | 0 |
| 7 | 49.036-49.236 | 7.5 | 42.5 | 0.2 |

*All compositions contained 0.364 ppm Tan Pigmentation Pantone Color 7528C with Pigments. Except for Composition 1, all compositions contain heat stabilizer CIBA Irganox B225 which is a 50/50 blend of an organo-phosphite and a hindered phenolic.
**Coupled, fractional melt flow rate, impact propylene copolymer available from The Dow Chemical Company.
***Macro-crystalline, compacted talc with a 1.5 micron median diameter and a platelet aspect ratio of 25 to 1 available from Luzenac.
+Super-coat, surface-modified with a mean particle size of 1.1 microns and a 10 microns maximum particle size available from Imerys.
++KibbeChem GMA 401 azodicarbonamide (added at the feed throat of the pipe middle layer extruder; not compounded into the polymer composition).

TABLE 2

Composition Test Methods

| Property | Test Method |
|---|---|
| Melt Flow Rate (MFR) (g/10 min) | ASTM D 1238, Condition 230° C., 2.16 kg. Flow Rates of Thermoplastics by Extrusion Plastometer. |
| Density (g/cm$^3$) | ASTM D 792, Density and Specific Gravity (Relative Density) of Plastics by Displacement. Method A. |
| Melt Strength (cN) | As described below. |
| Drawability (mm/s) | As described below. |
| Melting Temperature (° C.) | Differential Scanning Calorimetry (DSC) as described above. |
| Coefficient of Linear Thermal Expansion (CLTE) (in/in/° F. × 10$^{-6}$) | ASTM D-696-03 Standard Test Method for CLTE of Plastics Between −30° C. and 30° C. with a Vitreous Silica Dilatometer. |
| Heat Distortion Temperature (° F.) | ASTM D 648, Deflection Temperature of Plastics Under Flexural Load, 264 psi annealed. |
| IZOD Impact Strength @ 73° F. | ASTM D256, Impact Resistance of Plastic and Electrical Insulating Materials. Method A, Cantilever Beam (Izod Type) Test. |
| IZOD Impact Strength @ −20° F. | ASTM D256, Impact Resistance of Plastic and Electrical Insulating Materials. Method A, Cantilever Beam (Izod Type) Test. |
| Flexural Strength (psi) | ASTM D790, Flexural Properties of Un-reinforced and Reinforced Plastics and Electrical Insulating Materials. Method 1. |
| Secant Modulus (100,000 psi) | Flexural Properties of Un-reinforced and Reinforced Plastics and Electrical Insulating Materials. Method 1. |
| Tensile Modulus (100,000 psi) | ASTM D 638, Tensile Properties of Plastics. Type 1 specimen, at 0.2 inches per minute elongation rate. |
| Tensile Yield Strength (psi) | ASTM D 638, Tensile Properties of Plastics. Type 1 specimen, at 0.2 inches per minute elongation rate. |
| Weight Average Molecular Weight (Mw) (g/mol) | Gel permeation chromatography as described below. |
| Number Average Molecular Weight (Mn) (g/mol) | Gel permeation chromatography as described below. |

ASTM mechanical property testing is done in accordance with ASTM D4101 "Standard Specification for Polypropylene Injection and Extrusion Materials". This procedure contains specific conditions for polypropylene that apply to D256, D790 and D638 but not to D696.

Melt strength measurements are conducted on a Gottfert Rheotens 71.97 attached to a Gottfert Rheotester 2000 capillary rheometer. A polymer melt is extruded through a capillary die with a flat entrance angle (180 degrees) with a capillary diameter of 2.0 mm and an aspect ratio (capillary length/capillary radius) of 15.

After equilibrating the samples at 190° C. for 10 minutes, the piston is run at a constant piston speed of 0.265 mm/s. The standard test temperature is 190° C. The sample is drawn uniaxially to a set of accelerating nips located 100 mm below the die with an acceleration of 2.4 mm/s². The tensile force is recorded as a function of the take-up speed of the nip rolls.

Melt strength is reported as the plateau force (cN) before the strand breaks. The following conditions are used in the melt strength measurements: plunger speed is 0.265 mm/s; wheel acceleration is 2.4 mm/s²; capillary diameter is 2.0 mm; capillary length is 30 mm; and barrel diameter is 12.00 mm.

Melt drawability (measured in mm/s) is measured by pulling strands of the molten polymers or blends at constant acceleration until breakage occurs. The experimental set-up consists of a capillary rheometer and a Rheotens apparatus as take-up device. The molten strand is drawn uniaxially to a set of accelerating nips located 100 mm below the die. The force required to uniaxially extend the strands is recorded as a function of the take-up velocity of the nip rolls. In the case of polymer melts exhibiting draw resonance (indicated by the onset of a periodic oscillation of increasing amplitude in the measured force profile), the wheel velocity before the onset of draw resonance is taken as the drawability. In the absence of draw resonance, the velocity at which breakage occurs is defined as the melt drawability. The test is run under the following Drawability Test Conditions: mass flow rate of 1.35 g/min, temperature of 190° C., equilibration time at 190° C. of 10 minutes, die of 20:1 with entrance angle of approximately 45 degrees, capillary length of 41.9 mm, capillary diameter of 2.1 mm, piston diameter of 9.54 mm, piston velocity of 0.423 mm/s, shear rate of 33.0 s$^{-1}$., draw-down distance (die exit to take-up wheels) of 100 mm. cooling conditions of ambient air, and acceleration of 2.4 mm/s².

The polymers are analyzed by gel permeation chromatography (GPC) on a Polymer Laboratories PL-GPC-200 series high temperature unit equipped with refractometer detector and or light scattering detector, online viscometer detector. Three PLgel Mixed B (10 μm) or four PLgel Mixed A (20 μm) or three Shodex 13 μm column or four Shodex 13 μm are used. The oven temperature is at 140 to 160° C. with the autosampler hot and the warm zone at 130 to 160° C., depending on the polymer compositions. The solvent is nitrogen purged 1,2,4-trichlorobenzene (TCB) containing 250 ppm 2,6-di-t-butyl-4-methylphenol (BHT). The flow rate is 1.0 ml/min and the injection size is 100 to 200 μl. A 1 to 4 mg/ml sample concentration is prepared by dissolving the sample in $N_2$-purged TCB containing 250 ppm BHT for 2 to 4 hrs at 160° C. with gentle stirring.

The molecular weight determination is deduced by using 21 narrow molecular weight distribution polystyrene standards ranging from Mp 580-8,400,000 (Polymer Laboratories). The equivalent polypropylene molecular weights are calculated by using appropriate Mark-Houwink coefficients for polypropylene (as described by Th. G. Scholte, N. L. J. Meijerink, H. M. Schoffeleers, and A. M. G. Brands, *J. Appl. Polym. Sci.*, 29, 3763-3782 (1984), and polystyrene (as described by E. P. Otocka, R. J. Roe, N.Y. Hellman, P. M. Muglia, *Macromolecules*, 4, 507 (1971) in the Mark-Houwink equation.

TABLE 3

Composition Properties

| Composition No. | 1 | 2 | 3 | 4 | 5 | 6 | 7 |
| --- | --- | --- | --- | --- | --- | --- | --- |
| Property | | | | | | | |
| MFR (g/10 min) | 0.58 | 1.01 | 0.84 | 0.64 | 0.63 | 0.65 | 1.28 |
| Density (g/cm³) | 0.904 | 1.34 | 1.44 | 0.97 | 1.041 | 0.948 | 1.389 |
| Melt Strength (cN) | 27.9 | n/m | n/m | n/m | n/m | n/m | n/m |
| Drawability (mm/s) | 83.8 | n/m | n/m | n/m | n/m | n/m | n/m |
| Melting Temperature (° C.) | 165.28 | 164.71 | 164.26 | 165.08 | 164.82 | 164.97 | 164.26 |
| CLTE (in/in/F-6) | 46.67 | 27.67 | 24.89 | 43.06 | 40.72 | 41.61 | 26.06 |
| Heat Distortion Temperature (° F.) | 150 | 204.7 | 209.6 | 192.8 | 194.1 | 190.2 | 201.2 |
| IZOD Impact Strength at 73° F. | 8.8 | 2.9 | 2.3 | 4.1 | 3.5 | 6.1 | 2.9 |
| IZOD Impact Strength @ −20° F. | 4.4 | 0.8 | 1 | 1.5 | 1.4 | 1.7 | 0.9 |
| Flexural Strength (psi) | 5546 | 6190 | 5895 | 5788 | 5851 | 5764 | 5992 |
| Secant Modulus (100,000 psi) | 2.05 | 3.28 | 3.86 | 2.25 | 2.42 | 2.3 | 3.8 |
| Tensile Modulus (100,000 psi) | 1.77 | 2.64 | 2.42 | 2.11 | 2.27 | 2.19 | 2.89 |
| Tensile Yield Strength (psi) | 4145 | 3170 | 3126 | 4222 | 3926 | 4320 | 3174 |
| Mw (g/mol) | 403,700 | 397,200 | 341,300 | 456,100 | 453,000 | 459,500 | 373,300 |
| Mn (g/mol) | 81,980 | 84,860 | 58,430 | 91,800 | 88,650 | 100,200 | 85,840 | n/m = Not measured.

Table 3 reports the physical, thermal and rheological properties of the polymers utilized to extrude pipe examples. This data shows improvement in polymer performance. CLTE is significantly reduced, heat distortion is increased, flexural properties are increased, and tensile moduli are increased with the addition of mineral particle and platelet fillers.

Impact properties, although reduced with the addition of mineral fillers, offer sufficient improved properties to extrude pipe with demonstrated practical impact strength.

Compositions No. 1-7 are used to make the 3-layer pipes reported in Examples 1-7. These 3-layer pipes are extruded utilizing three single screw reciprocating screw extruders with a length to diameter ratio of 32 to 1 and a compression ratio of 2.4 to 1. The pipe is sized by vacuum die and cooled by water spray. The polymer melt temperature is from 390° F. to 408° F. Comparative Example 1 is a commercially available 3-layer pipe made of polyvinylchloride (PVC), and Comparative Example 2 is a commercially available 3-layer pipe made of acrylonitrile/butadiene/styrene (ABS).

Table 4 reports the test methods used to measure various properties of the pipes and pipe layers. The cell appearance in the core layer of each of the pipes of Examples 1-7 is uniform, discrete, closed, smooth and oval, as observed by optical microscopy. The cell appearance of the PVC and ABS core layers is closed, round to oval in shape, and relatively uniform in size and distribution across the cross-section of the core layer. Tables 5-11 report the composition and selected properties of each layer of the 3-layer pipe, and the pipe itself, for the pipe of each of Examples 1-7, respectively. Tables 12 and 13 report similarly for the PVC and ABS pipes of Comparative Examples 1 and 2, respectively. Both comparative samples were Schedule 40 iron pipe size cellular core pipe.

TABLE 4

Pipe Layer and Pipe Property Test Methods

| Property | Test Method |
|---|---|
| Cell Size (inch) | Optical Microscope (if the shape of the cell is not round, e.g., it is oval, then cell size is measured across the shortest axis) |
| Wall thickness (inch) | Optical Microscope |
| Pipe Outside Diameter (inch) | Digital Caliper |
| Weight per Foot | 6" to 12" pipe sample is weighed on a balance with accuracy to 0.1 g. Pipe length is measured with a digital caliper and ratio calculated to determine 12 inch or 1 foot weight. |

TABLE 5

Example 1: 4" Schedule 40 IPS Cellular Core Pipe

|  | Inner Layer | Core Layer | Outer Layer | Pipe |
|---|---|---|---|---|
| Composition | 1 | 2 | 3 |  |
| Cell Size (inch) | solid | 0.021" | solid | n/a |
| Wall Thickness (inch) | 0.022" | 0.200" | 0.026" | 0.248" |
| Pipe Outside Diameter (inch) | n/a | n/a | n/a | 4.463 |
| Weight per Foot | n/a | n/a | n/a | 1.29 |

TABLE 6

Example 2: 3" Schedule 40 IPS Cellular Core Pipe

|  | Inner Layer | Core Layer | Outer Layer | Pipe |
|---|---|---|---|---|
| Material | 4 | 7 | 3 |  |
| Cell Size (inch) | solid | 0.010" | solid | n/a |
| Wall Thickness (inch) | 0.025" | 0.194 | 0.020" | 0.239 |
| Pipe Outside Diameter (inch) | n/a | n/a | n/a | 3.473 |
| Weight per Foot | n/a | n/a | n/a | 1.07 |

TABLE 7

Example 3: 3" Schedule 40 IPS Cellular Core Pipe

|  | Inner Layer | Core Layer | Outer Layer | Pipe |
|---|---|---|---|---|
| Material | 5 | 7 | 3 |  |
| Cell Size (inch) | solid | 0.010" | solid | n/a |
| Wall Thickness (inch) | 0.024" | 0.188 | 0.027" | 0.239 |
| Pipe Outside Diameter (inch) | n/a | n/a | n/a | 3.472 |
| Weight per Foot | n/a | n/a | n/a | 1.14 |

TABLE 8

Example 4: 1.5" Schedule 40 IPS Cellular Core Pipe

|  | Inner Layer | Core Layer | Outer Layer | Pipe |
|---|---|---|---|---|
| Material | 6 | 7 | 3 |  |
| Cell Size (inch) | solid | 0.011 | solid | n/a |
| Wall Thickness (inch) | 0.027 | 0.117 | 0.031 | 0.175 |
| Pipe Outside Diameter (inch) | n/a | n/a | n/a | 1.895 |
| Weight per Foot | n/a | n/a | n/a | 0.394 |

TABLE 9

Example 5: 1.5" Schedule 40 IPS Cellular Core Pipe

|  | Inner Layer | Core Layer | Outer Layer | Pipe |
|---|---|---|---|---|
| Material | 4 | 7 | 3 |  |
| Cell Size (inch) | solid | 0.011 | solid | n/a |
| Wall Thickness (inch) | 0.032 | 0.103 | 0.034 | 0.169 |
| Pipe Outside Diameter (inch) | n/a | n/a | n/a | 1.892 |
| Weight per Foot | n/a | n/a | n/a | 0.391 |

TABLE 10

Example 6: 4" Schedule 40 IPS Cellular Core Pipe

|  | Inner Layer | Core Layer | Outer Layer | Pipe |
|---|---|---|---|---|
| Material | 4 | 7 | 3 |  |
| Cell Size (inch) | solid | 0.017 | solid | n/a |
| Wall Thickness (inch) | 0.051 | 0.187 | 0.053 | 0.291 |

TABLE 10-continued

Example 6: 4" Schedule 40 IPS Cellular Core Pipe

|  | Inner Layer | Core Layer | Outer Layer | Pipe |
|---|---|---|---|---|
| Pipe Outside Diameter (inch) | n/a | n/a | n/a | 4.464 |
| Weight per Foot | n/a | n/a | n/a | 1.59 |

TABLE 11

Example 7: 4" Schedule 40 IPS Cellular Core Pipe

|  | Inner Layer | Core Layer | Outer Layer | Pipe |
|---|---|---|---|---|
| Material | 6 | 7 | 3 |  |
| Cell Size (inch) | solid | 0.017 | Solid | n/a |
| Wall Thickness (inch) | 0.047 | 0.17 | 0.052 | 0.269 |
| Pipe Outside Diameter (inch) | n/a | n/a | n/a | 4.485 |
| Weight per Foot | n/a | n/a | n/a | 1.48 |

TABLE 12

Comparative Example 1: PVC 3" Schedule 40 IPS Cellular Core Pipe

|  | Inner Layer | Core Layer | Outer Layer | Pipe |
|---|---|---|---|---|
| Material | PVC | PVC | PVC |  |
| Weight per Foot | n/a | n/a | n/a | 0.900 |
| Cell size (inch) | solid | 0.005 | solid | n/a |
| Wall Thickness (inch) | 0.043 | 0.174 | 0.009 | 0.226 |
| Pipe Outside Diameter (inch) | n/a | n/a | n/a | 3.500 |

TABLE 13

Comparative Example 2: ABS 3" Schedule 40 IPS Cellular Core Pipe

|  | Inner Layer | Core Layer | Outer Layer | Pipe |
|---|---|---|---|---|
| Material | ABS | ABS | ABS |  |
| Weight per Foot | n/a | n/a | n/a | 0.69 |
| Cell Size (inch) | solid | 0.012 | solid | n/a |
| Wall Thickness (inch) | 0.023 | 0.184 | 0.019 | 0.226 |
| Pipe Outside Diameter (inch) | n/a | n/a | n/a | 3.500 |

The pipe examples in Tables 5-11 demonstrate that multiple layer cellular core pipe can be produced with considerable weight reduction as compared to solid wall pipe as shown by the weight per foot of pipe. Many of the reported compositions are highly mineral filled polymers. The calcium carbonate and talc utilized in these examples have a density of 2.7 g/cc. These pipe examples demonstrate the ability to form foamed cells of significantly large size while exhibiting acceptable weight reduction for cost savings and interfacial adhesion with no fillers to highly mineral filled polymers.

The data reported in Tables 5-11 present a physical description of the extruded pipe samples. Tables 12 and 13 offer a comparative showing of drain, waste and vent pipes that are commercially available in the market. The pipes of these comparative examples are available at retail home building centers.

Although the invention has been described in considerable detail through the above specification and examples, this detail is for the purpose of illustration. Many variations and modifications can be made without departing from the spirit and scope of the invention as described in the following claims.

What is claimed is:

1. A mineral-filled, polypropylene composition comprising (i) a coupled blend of a polypropylene homopolymer and an impact modifier, (ii) greater than 53 weight percent (wt %) based on the weight of the composition of at least one mineral filler, and (iii) a foaming agent.

2. The composition of claim 1 in which the mineral filler comprises a platelet filler and a non-platelet filler, and the amount of mineral filler in the composition is from 55 to 60 wt % based on the total weight of the composition.

3. The composition of claim 2 in which the platelet filler and the non-platelet filler are present in a weight ratio between 1:30 and 1:3.

4. The composition of claim 3 in which the mean particle size of the non-platelet filler is from 0.2 to 3 microns, the mean particle size of the platelet filler is from 0.1 to 3 microns, and the length to thickness (L/T) ratio of the platelet filler is between 1 and 50.

5. The composition of claim 1 in which the polypropylene homopolymer has a crystallinity of at least 50 percent.

6. The composition of claim 5 in which the impact modifier comprises from 8 to 40 wt % of the coupled blend.

7. An article comprising the composition of claim 1.

8. The article of claim 7 in the form of a pipe.

9. The article of claim 8, wherein the pipe is of three layers comprising (a) a first or outer or outside non-foam layer; (b) a second or middle or core foam layer; and (c) a third or inner or inside non-foam layer.

10. A mineral-filled, polypropylene composition comprising (i) a coupled blend of polypropylene homopolymer having a crystallinity of at least 50 percent, and an impact modifier comprising from 8 to 40 wt % of the coupled blend, (ii) at least 25 weight percent (wt %) based on the weight of the composition of at least one mineral filler, and (iii) a foaming agent,
wherein the coupled impact propylene copolymer, or coupled blend of polypropylene homopolymer and impact modifier, is formed by the reaction of (a) a coupling agent having at least two reactive groups that are each capable of forming a carbene or nitrene group, and (b) an impact propylene polymer.

11. The composition of claim 10 in which the coupling agent is an azide.

12. The composition of claim 10 in which the mineral filler comprises a platelet filler and a non-platelet filler, and the amount of mineral filler in the composition is from 28 to 60 wt % based on the total weight of the composition.

13. The composition of claim 12 in which the platelet filler and the non-platelet filler are present in a weight ratio between 1:30 and 1:3.

14. The composition of claim 13 in which the mean particle size of the non-platelet filler is from 0.2 to 3 microns, the mean particle size of the platelet filler is from 0.1 to 3 microns, and the length to thickness (L/T) ratio of the platelet filler is between 1 and 50.

15. An article comprising the composition of claim 10.

16. The article of claim 15 in the form of a pipe.

17. The article of claim 16, wherein the pipe is of three layers comprising (a) a first or outer or outside non-foam layer; (b) a second or middle or core foam layer; and (c) a third or inner or inside non-foam layer.

* * * * *